United States Patent
Franckhauser et al.

(10) Patent No.: US 10,961,043 B1
(45) Date of Patent: Mar. 30, 2021

(54) AEROSOL CONTAINER WITH SPACED SEALING BEADS

(71) Applicant: The Procter & Gamble Company, Cincinnati, OH (US)

(72) Inventors: Andrew William Franckhauser, Batavia, OH (US); Abbey A. Lopez, Cincinnati, OH (US); Douglas Bruce Zeik, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/809,682

(22) Filed: Mar. 5, 2020

(51) Int. Cl.
*B65D 83/38* (2006.01)
*B65D 83/20* (2006.01)
*F16J 15/02* (2006.01)
*B65D 83/70* (2006.01)

(52) U.S. Cl.
CPC ........... *B65D 83/38* (2013.01); *B65D 83/207* (2013.01); *B65D 83/70* (2013.01); *F16J 15/02* (2013.01)

(58) Field of Classification Search
CPC .......... B67D 1/12; B67D 1/125; B65D 83/70; F16K 24/02; F16K 24/04
See application file for complete search history.

(56) References Cited

U.S. PATENT DOCUMENTS

| | | | | |
|---|---|---|---|---|
| 2,822,961 A | * | 2/1958 | Seaquist | B65D 83/70 222/397 |
| 2,880,744 A | * | 4/1959 | Daley, Jr. | F16K 24/04 137/197 |
| 2,948,439 A | * | 8/1960 | Glover | B65D 23/0814 222/183 |
| 3,083,854 A | * | 4/1963 | Lusher | B65D 83/70 215/307 |
| 3,450,305 A | * | 6/1969 | Buchanan | B65D 83/70 220/89.4 |
| 3,759,414 A | * | 9/1973 | Beard | B65D 83/70 220/203.09 |
| 3,786,967 A | * | 1/1974 | Giocomo | B65D 83/38 222/397 |
| 3,850,339 A | * | 11/1974 | Kinkel | B65D 83/70 220/89.2 |
| 3,912,130 A | * | 10/1975 | Pelton | B65D 83/70 222/396 |
| 3,918,610 A | * | 11/1975 | Willis | B65D 83/70 222/397 |
| 3,918,611 A | * | 11/1975 | Ewald | B65D 83/20 222/396 |
| 4,721,224 A | * | 1/1988 | Kawabata | B65D 83/70 220/89.2 |

(Continued)

*Primary Examiner* — Paul R Durand
*Assistant Examiner* — Randall A Gruby
(74) *Attorney, Agent, or Firm* — Abbey A. Lopez

(57) ABSTRACT

An aerosol dispenser, an outer container for an aerosol dispenser, and a preform for an outer container. The aerosol dispenser, outer container, and preform each have a neck including a crimp ring. The crimp ring may be configured to receive a valve cup, which is clinched thereto. The crimp ring includes one or more vents. The vents may be used to control overpressurization within the dispenser. The vents may be exposed to pressurized propellant and product due to deformation of the neck during undue overpressurization. The vents allow propellant and/or product to be released therethrough in the event of overpressurization.

6 Claims, 12 Drawing Sheets

(56) References Cited

U.S. PATENT DOCUMENTS

| | | | | |
|---|---|---|---|---|
| 4,969,577 A * | 11/1990 | Werding | B65D 83/14 | 141/3 |
| 5,038,952 A * | 8/1991 | Dorfman | B65D 53/04 | 215/324 |
| 5,121,858 A * | 6/1992 | Chong | B65D 83/70 | 222/397 |
| 5,152,411 A * | 10/1992 | Pope | B65D 23/00 | 215/381 |
| 5,199,615 A | 4/1993 | Downing | | |
| 5,219,005 A * | 6/1993 | Stoffel | B65D 83/62 | 141/20 |
| 5,249,701 A * | 10/1993 | Daehn | B65D 83/38 | 220/612 |
| 5,460,300 A * | 10/1995 | Tritsch | B05B 9/0822 | 222/401 |
| 6,253,970 B1 * | 7/2001 | Kohn | B65D 83/70 | 137/843 |
| 6,651,847 B2 * | 11/2003 | Mekata | B65D 83/38 | 222/105 |
| 7,303,087 B2 * | 12/2007 | Flashinski | B65D 83/38 | 215/311 |
| 8,119,211 B1 * | 2/2012 | Taylor | B32B 27/327 | 428/35.2 |
| 8,869,842 B2 * | 10/2014 | Smith | B65B 3/045 | 141/3 |
| 8,960,503 B2 * | 2/2015 | Soliman | B65D 81/2053 | 222/402.1 |
| 9,199,783 B2 * | 12/2015 | Wanbaugh | B05B 11/3047 | |
| 9,334,103 B2 * | 5/2016 | Soliman | B65D 83/205 | |
| 10,071,850 B2 * | 9/2018 | Sugawara | B65D 83/75 | |
| 10,485,939 B2 * | 11/2019 | Noble | B05B 11/0038 | |
| 10,604,310 B2 * | 3/2020 | Kutsuzawa | B65D 83/0055 | |
| 2003/0215400 A1 * | 11/2003 | Schroeder | A61Q 15/00 | 424/47 |
| 2005/0127022 A1 * | 6/2005 | Flashinski | B65D 83/38 | 215/40 |
| 2006/0048843 A1 * | 3/2006 | Yerby | B65D 83/62 | 141/20 |
| 2008/0164256 A1 * | 7/2008 | Youm | B05B 15/14 | 220/203.08 |
| 2012/0241457 A1 | 9/2012 | Hallman | | |
| 2014/0209633 A1 * | 7/2014 | McDaniel | B29C 49/0073 | 222/95 |
| 2014/0361038 A1 * | 12/2014 | Mekata | B65D 83/62 | 222/95 |
| 2015/0329273 A1 * | 11/2015 | Salameh | B65D 83/40 | 222/402.1 |
| 2016/0288986 A1 * | 10/2016 | Patel | B29C 49/06 | |
| 2018/0155115 A1 * | 6/2018 | Wolak | B65D 83/38 | |
| 2019/0135529 A1 * | 5/2019 | Zeik | B65D 83/38 | |
| 2019/0135532 A1 * | 5/2019 | Franckhauser | B65D 83/384 | |
| 2019/0169878 A1 * | 6/2019 | Perrenoud | E05B 71/00 | |
| 2019/0202625 A1 * | 7/2019 | Franckhauser | B65D 83/38 | |
| 2019/0225355 A1 * | 7/2019 | Siegl | B65D 83/207 | |
| 2020/0109000 A1 * | 4/2020 | Martin | B65D 83/40 | |

\* cited by examiner

AEROSOL CONTAINER WITH SPACED SEALING BEADS

FIELD

The present disclosure is directed to an aerosol container and aerosol dispensers comprising the same, and, more particularly, to an aerosol container that maintains a relatively robust seal at elevated temperatures and safely and effectively addresses overpressurization at excessive temperatures and aerosol dispensers comprising the same.

BACKGROUND

Aerosol dispensers are well known in the art. Aerosol dispensers typically comprise an outer container which acts as a frame for the remaining components and as a pressure vessel for propellant and product contained therein. Outer containers made of metal are well known in the art. However, metal containers can be undesirable due to high cost and limited recyclability. Attempts to use plastic have occurred in the art. Aerosol dispensers made from plastic or at least partially made from plastic may be advantageous due to cheaper manufacturing costs, recyclability, and greater versatility in design, for example.

However, plastic components are more susceptible to elevated temperatures. Aerosol dispensers have typically been used to dispense products which can be used independent of the product temperature. For example, aerosol dispensers are commonly used to dispense cleaning products, insecticide, air fresheners, shaving cream, etc. These products are ubiquitously dispensed at the temperature ambient to the aerosol dispenser, typically room temperature.

However, room temperature may not be optimum for all products. Some products may be more optimally used in a warmed or heated condition, the terms being used interchangeably, and, thus, may undergo intentional heating. For example, certain foods are more palatable when served warm. Air freshener may disperse better when warmed. Shaving cream may be perceived to be more comfortable when warmed.

Additionally, some products may be inadvertently heated when left unattended in relatively hot environments. For example, aerosol dispensers are shipped and, thus, may be subject to shipping containers having relatively elevated temperatures or excessive temperatures. Further, some aerosol dispensers contain products which consumers carry with them and, thus, may be left unattended in environments with elevated temperatures or excessive temperatures, such as automobiles.

Overpressurization and deformation may occur during heating, either intentionally or inadvertently, of an aerosol dispenser. This overpressurization and deformation may result in rupture of the aerosol dispenser and/or premature loss of propellant and/or product. Attempts have been made to address this potentially hazardous situation of having the aerosol dispenser rupture by controlling the dispenser itself, such as by selection of specific materials and shapes of components, and/or the loss of propellant and/or product. However, there remains a need for improved control and release of propellant and/or product from aerosol dispensers exposed to elevated temperatures.

Accordingly, it is an object of this invention to provide an aerosol dispenser that addresses the occurrence of rupture in the event of overpressurization and improved control over the release of propellant and/or product.

SUMMARY

Combinations:

A. A container for use an aerosol dispenser, the container comprising:
  a crimp ring defining an open top and extending about a longitudinal axis;
  a closed end bottom opposite the open top;
  a sidewall extending between the crimp ring and the closed end bottom;
  wherein the crimp ring comprises:
    an upper surface and a lower surface opposite the upper surface, wherein the upper surface and the lower surface are joined by an outer surface, and an inside diameter surface opposite the outer surface, wherein the outer surface comprises a radially outermost point,
    wherein the upper surface comprises an outer annular bead proximal to the outer surface and an inner annular sealing bead proximal to the inner surface; and
    wherein the outer annual bead and the inner annual bead each comprise a longitudinally uppermost point, wherein the radial distance between the longitudinally uppermost point of the inner annular bead and the longitudinally uppermost point of the outer annular bead is greater than the radial distance between the longitudinally uppermost point of the outer annular bead and the radially outermost point of the outer surface.

B. The container of Paragraph A, wherein the radial distance between the longitudinally uppermost point of the inner annular bead and the longitudinally uppermost point of the outer annular bead is at least 100% longer than the radial distance between the longitudinally uppermost point of the outer annular bead and the radially outermost point of the outer surface C. The container of Paragraph A or Paragraph B, wherein a vent is disposed on the outer surface of the crimp ring D. The container of any of Paragraphs A through C, wherein the vent disposed on the outer surface of the crimp ring extends from the lower surface through a portion of the outer surface.

E. The container of any of Paragraphs A through D further comprising a plurality of circumferentially spaced vents disposed on the outer surface of the crimp ring.

F. The container of any of Paragraphs A through E further comprising a plurality of integrally injection molded circumferentially spaced vents disposed on the outer surface of the crimp ring.

G. The container of any of Paragraphs A through F further comprising a first plurality of integrally injection molded circumferentially spaced vents disposed on the outer surface of the crimp ring and a second plurality of circumferentially spaced vents disposed on the lower surface of the crimp ring and circumferentially aligned with the first plurality of vents.

H. The container of any of Paragraphs A through G further comprising a first plurality of integrally injection molded circumferentially spaced vents disposed on the outer surface of the crimp ring and a second plurality of circumferentially spaced vents disposed on the inside diameter surface of the crimp ring.

I. A container for use in an outer container of an aerosol dispenser, the preform comprising:
   a crimp ring defining an open top and extending about a longitudinal axis;
   a closed end bottom opposite the open top;
   a sidewall extending between the crimp ring and the closed end bottom;
   wherein the crimp ring comprises an upper surface and a lower surface opposite the upper surface, wherein the upper surface and the lower surface are joined by an outer surface, and an inside diameter surface opposite the outer surface,
      wherein the upper surface comprises an annular, wherein the annular bead comprises a longitudinally uppermost point,
      wherein the outer surface comprises a vent, the vent comprising a radially outermost point, and
      wherein the axially uppermost point of the annular bead is positioned further from the longitudinal axis than the radially outermost point of the vent.

J. The container of Paragraph I, wherein the vent extends from the lower surface through a portion of the outer surface.

K. The container of Paragraph I or Paragraph J, wherein the annular bead is an outer annular bead, and wherein the crimp ring further comprises an inner annular bead positioned proximate to the inside diameter surface.

L. The container of any of Paragraphs I through K further comprising a plurality of circumferentially spaced longitudinally parallel vents disposed on the outer surface of the crimp ring.

M. The container of any of Paragraphs I through L further comprising a plurality of integrally injection molded circumferentially spaced vents disposed on the outer surface of the crimp ring.

N. The container of any of Paragraphs I through M further comprising a first plurality of integrally injection molded circumferentially spaced vents disposed on the outer surface of the crimp ring and a second plurality of circumferentially spaced vents disposed on the inside diameter surface of the crimp ring.

O. The container of any of Paragraphs I through N further comprising a first plurality of integrally injection molded vents circumferentially spaced and longitudinally oriented disposed on the outer surface of the crimp ring and radially oriented on the lower surface of the crimp ring, and a second plurality of circumferentially spaced vents disposed on the inside diameter surface of the crimp ring.

P. The container of any of Paragraphs I through O further comprising a valve cup joined to the crimp ring, a gasket disposed between the valve cup and the crimp ring, a valve disposed in the valve cup, and a propellant disposed in the outer container.

Q. The container of Paragraph P, wherein the gasket has a thickness in the range of 0.762 mm to 1.524 mm and a hardness in the range of 60 Shore A to 80 Shore A.

R. The container of any of Paragraphs I through Q, comprising a shoulder adjacent the crimp ring, wherein the lower neck portion extends from the crimp ring to the shoulder.

S. An aerosol dispenser for dispensing a product, the aerosol dispenser comprising:
   an outer container defining an open top and having a bottom opposite the open top;
   a crimp ring extending about the open top of the outer container;
   a sidewall extending between the crimp ring and the bottom of the outer container;
   a valve cup joined to the crimp ring;
   a valve joined to the valve cup for dispensing product from the outer container; and
   a propellant disposed in the outer container,
   wherein the crimp ring comprising:
      an upper surface and a lower surface opposite the upper surface, wherein the upper surface and the lower surface are joined by an outer surface, and an inside diameter surface opposite the outer surface, wherein the outer surface comprises a radially outermost point,
      wherein the upper surface comprises an outer annular bead proximal to the outer surface and an inner annular sealing bead proximal to the inner surface; and
      wherein the outer annual bead and the inner annual bead each comprise a longitudinally uppermost point, wherein the radial distance between the longitudinally uppermost point of the inner annular bead and the longitudinally uppermost point of the outer annular bead is greater than the radial distance between the longitudinally uppermost point of the outer annular bead and the radially outermost point of the outer surface.

T. The aerosol of Paragraph S further comprising a first plurality of integrally injection molded vents circumferentially spaced and longitudinally oriented disposed on the outer surface of the crimp ring and radially oriented on the lower surface of the crimp ring, and a second plurality of circumferentially spaced vents disposed on the inside diameter surface of the crimp ring.

DETAILED DESCRIPTION

Figure 1:
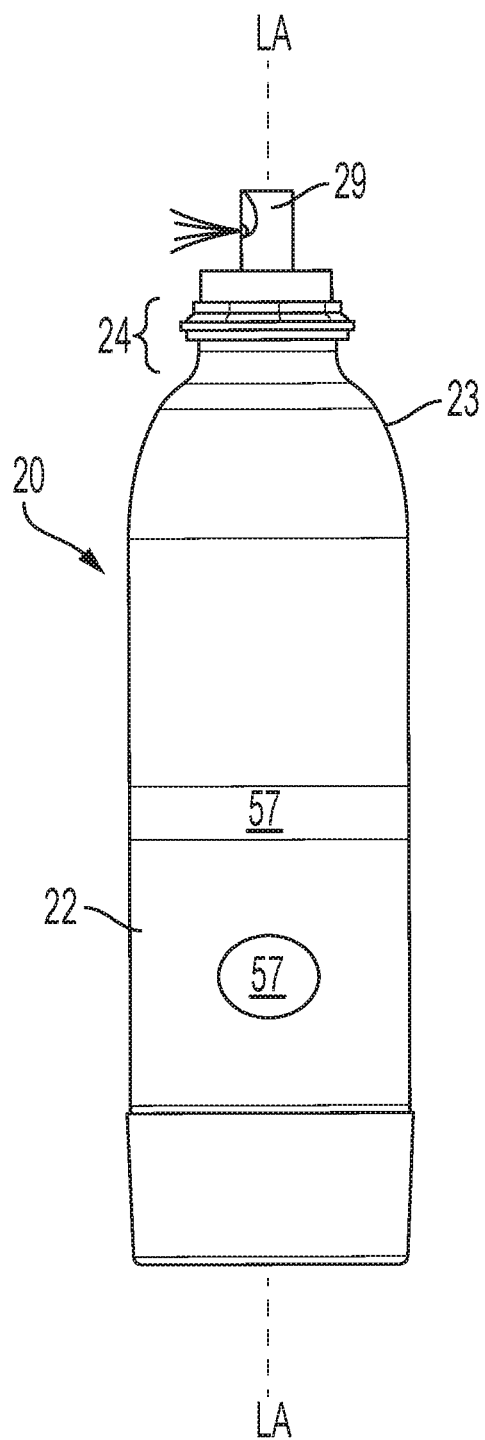
FIG. 1 is a side elevational view of an aerosol dispenser.
Figure 2:
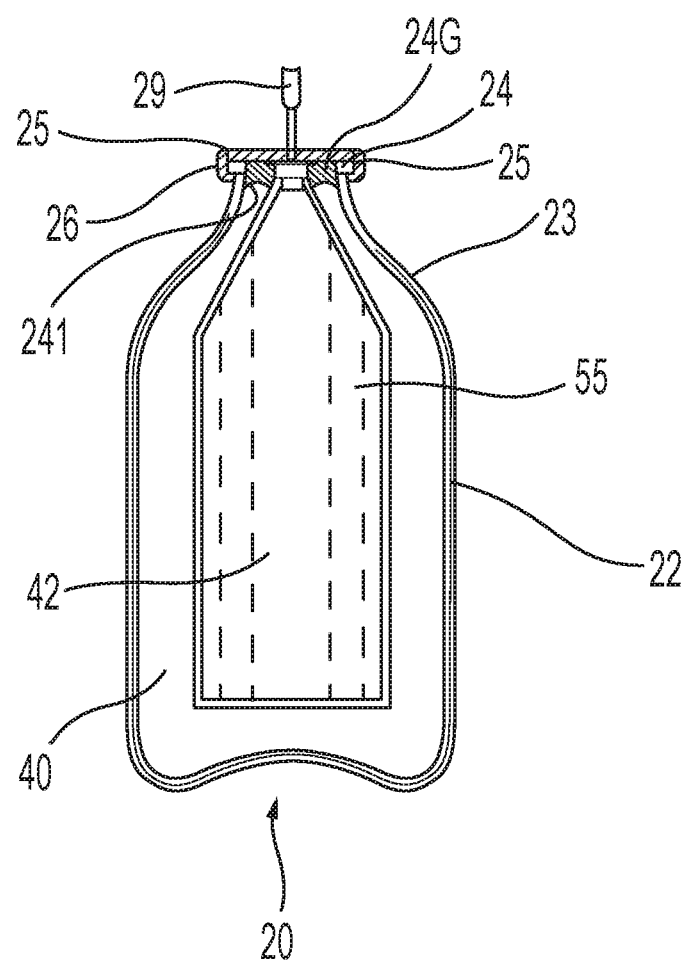
FIG. 2 is a side elevational sectional view of an aerosol dispenser having a collapsible bag.
Figure 3:
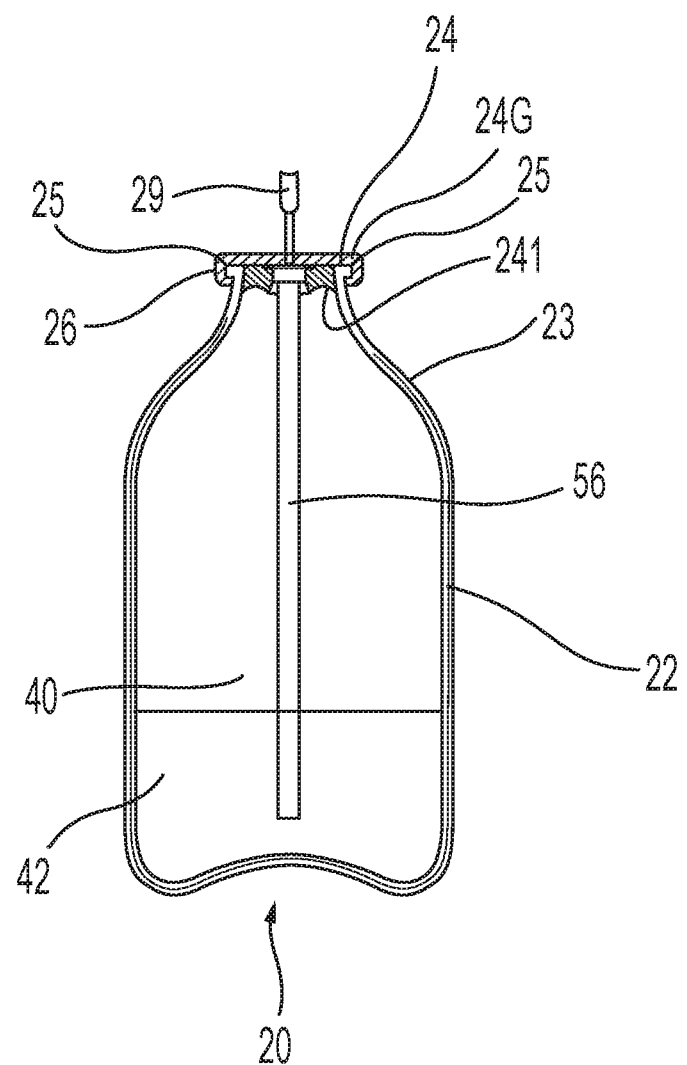
FIG. 3 is a side elevational sectional view an aerosol dispenser having a dip tube.

Referring to FIGS. 1-3, an aerosol dispenser 20 is shown. The aerosol dispenser 20 comprises a pressurizeable outer container 22 usable for such a dispenser. The outer container 22 may comprise plastic. The outer container 22 has both product 40 and propellant 42 disposed therein.

The outer container 22 has an opening with a valve cup 26 therein. A user activated dispensing valve may be disposed in the valve cup 26. A product delivery device may be joined to the valve cup 26. Propellant 40 may be disposed between the outer container 22 and the product delivery device. The product 42 and propellant 40 may be separately dispensed or may be dispensed together.

The aerosol dispensers 20, and components thereof, may have a longitudinal axis LA, and may optionally be axisymmetric with a round cross section. Alternatively, the outer container 22 may be eccentric and have a square, elliptical or other cross section.

Figure 4:
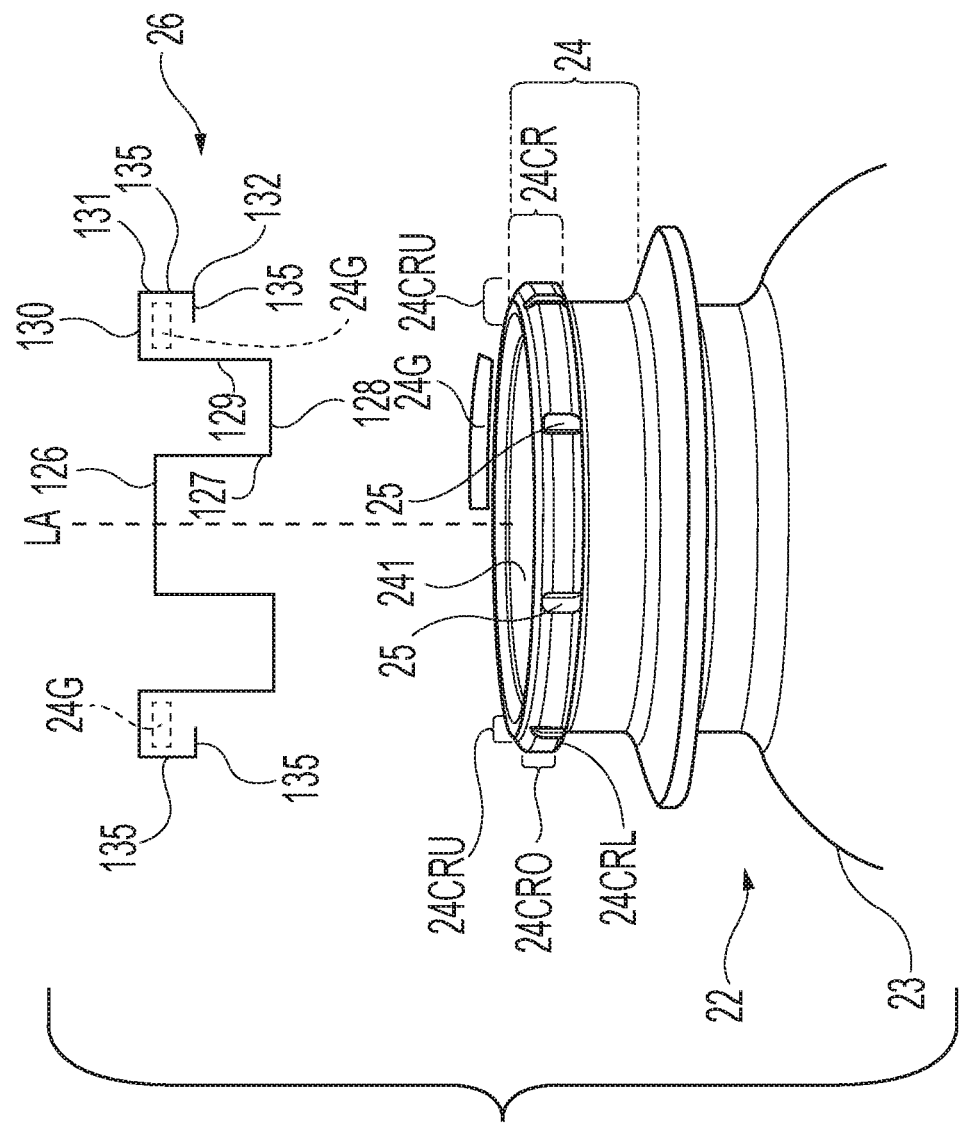
FIG. 4 is a partial side elevation view of an outer container for the aerosol dispenser having a fragmentary exploded gasket and an exploded sectional valve cup, the gasket being shown in phantom in position in the valve cup.

With reference to FIG. 4, the outer container 22 may have a neck 24 that defines an opening. The opening may be at the top of the pressurizeable container 22 when the pressurizeable container 22 is in its-in use position. Other components may be sealed to the neck 24. The neck 24 may include a crimp ring 24CR. The neck may include an upper portion and a lower portion. The crimp ring 24CR may be disposed about the upper portion of the neck. A portion of the crimp ring 24CR may extend radially outwardly from a portion of the neck 24. A metal valve cup 26 may be clinched to the crimp ring 24CR. A gasket 24G may be disposed between the top of the crimp ring 24CR and the valve cup 26.

The valve cup 26 may be integral and formed from a single piece of metal comprising plural contiguous and annular walls. Alternatively, the valve cup 26 may comprise plastic, or any material suitable for forming around or welding to the crimp ring 24CR. Each wall of the valve cup 26 has opposed inner and outer surfaces, the inner surfaces generally facing downward or towards the longitudinal axis LA.

Referring to FIGS. 1 and 4, the valve cup 26 may have a center hole, to allow for a valve stem to longitudinally move therethrough. Radially outward from and adjacent the hole may be an annular platform 126. Adjacent, radially outward from and contiguous the platform 126 may be an annular inner skirt wall 127. Adjacent, radially outward from and contiguous the inner skirt wall 127 may be an annular bottom wall 128. Adjacent, radially outward from and contiguous the bottom wall 128 may be an annular outer skirt wall 129.

The outer skirt wall 129 may be spaced away from the inside diameter surface 241 of the neck 24 to allow for ease of assembly. Adjacent, radially outward from and contiguous the outer skirt wall 129 may be an annular top wall 130. The inner surface of the top wall 130 may seal against the gasket 24G. Adjacent, radially outward from and contiguous the top wall 130 may be an annular outer wall 131. The inner surface of the outer wall 131 may seal against the outer surface 24CRO of the crimp ring 24CR. Adjacent, radially outward from and contiguous the outer wall 129 may be an annular bottom wall 132. The bottom wall 132 may engage the lower surface 24CRL of the crimp ring 24CR to clamp the valve cup 26 in place. The walls 126, 127, 128, 129, 130, 131, 132 are shown in concentric, parallel, and orthogonal relationships, although, it is to be appreciated that any suitable angular relationship may be used.

The annular outer wall 131 of the valve cup 26 may be perforate. By perforate it is meant that the outer wall 131 is gas permeable. Gas permeability may be attained by one or more circumferentially spaced holes 135 through the outer wall 131. The holes 135 allow for exhausting of propellant 40 and/or product 42 therethrough which escapes past the gasket 24G to ambient.

The holes 135 may be longitudinally centered or intercept the bottom wall 132. The holes 135 may be equally or unequally sized, equally or unequally circumferentially spaced, and equally or unequally longitudinally disposed. For the system described herein, three to fifteen spaced holes 135, having a diameter of 0.3 mm to 1 mm are believed to be suitable and particularly four holes equally spaced at 90 degrees and having a diameter of 0.8 mm is believed suitable.

Recycling class 1 thermoplastic elastomer [TPE] may be selected for the gasket 24G. The TPE material may be selected to be resistant to the propellant 40 and/or product 42 desired for use. A hydrophilic TPE-E based compound formulated to provide adhesion to PET and chemical resistance to silicone oil may be used as one or more components in the aerosol dispenser 20. Class 1 TPE material sold by Kraiburg TPE GmbH & Co KG of Waldkraiburg, Germany under the name Hcc8791-52 may be suitable.

The gasket may be made of a chemical and/or perfume resistant material. Exemplary gaskets may be made of Buna rubber. The thickness and/or hardness of the gasket may impact the quality of the seal formed between the crimp ring and the valve cup at elevated temperatures up to 65° C. and encourage safe degassing or venting at excess temperatures above 65° C. The gasket may have a thickness in the range of 0.762 mm to 1.524 mm. The durometer/hardness of the gasket may be in the range of about 60 Shore A to about 80 Shore A. An exemplary gasket may be made of Buna rubber and may have a thickness of about 1.270 mm and a hardness of 70 Shore A.

A dispensing valve, in turn, may be disposed within the valve cup 26. The dispensing valve provides for retention of product 42 within the aerosol dispenser 20 until the product 42 is selectively dispensed by a user. The product 42 may be dispensed through a dip tube 56 or from a bag 55, as is known in the art. The dispensing valve may be selectively actuated by an actuator 29. Selective actuation of the dispensing valve allows the user to dispense a desired quantity of the product 42 on demand. Illustrative and nonlimiting products 42 for use with the dispenser may include shave cream, shave foam, body sprays, body washes, perfumes, cleansers, air fresheners, astringents, foods, paints, etc.

Referring to FIGS. 2 and 3, inside the outer container 22 may be a product delivery device. The product delivery device may comprise a collapsible bag 55 as shown in FIG. 2. The collapsible bag 55 may be mounted in sealing relationship to the neck 24 of the container and/or to the dispensing valve. This arrangement may be referred to as a bag-on-valve. The collapsible bag 55 may hold product 42 therein and prevent intermixing of the product 42 with the propellant 40. The propellant 40 may be stored outside the collapsible bag 55, and inside the outer container 22. The collapsible bag 55 may expand upon being charged with product 42. Such expansion decreases the available volume inside the outer container 22. Decreasing the available volume increases the pressure of any propellant 40 therein according to Boyles law.

The product delivery device may alternatively or additionally comprise a dip tube 56 as shown in FIG. 3. The dip tube 56 may extend from a proximal end sealed to the dispensing valve. The dip tube 56 may terminate at a distal end juxtaposed with the bottom of the outer container 22, allowing for intermixing of the product 42 and propellant 40. The product 42 and the propellant 40 may be co-dispensed in response to selective actuation of the dispensing valve by a user. Again, insertion of product 42 and/or propellant 40 into the outer container 22 increases pressure therein according to Boyles law.

The outer container 22 may comprise a plastic pressurizeable container. The plastic may be polymeric. For example, the plastic pressurizeable container may include PET. The dispensing valve, and optional valve cup 26 may be joined, such as by welding, to the neck 24 of the outer container 22, as discussed below. The valve cup 26 may be clinched to the neck 24. Any number of known valve assemblies may be usable with the dispenser. One suitable and non-limiting example, is shown. A suitable dispensing valve may be made as described in US Patent Publication Nos. 2010/0133301A1 and 2010/0133295A1.

The pressurizeable container may further include a propellant 40. The propellant 40 may be disposed in the outer container 22. The propellant 40 may be disposed in the outer container 22 and/or the collapsible bag 55. The pressure in the outer container 22 may be greater than the pressure in the collapsible bag 55, so that product 42 may be dispensed from within the bag. If a dip tube 56 is selected for the product delivery device, the propellant 40 and product 42 may be intermixed, and thus co-dispensed. The pressure of the propellant 40 within the outer container 22 provides for dispensing of the product 42/co-dispensing of product 42/propellant 40 to ambient, and optionally to a target surface. The target surface may include a surface to be cleaned or otherwise treated by the product 42, skin, etc. Such dispensing occurs in response to the user actuating the dispensing valve.

Examining the components in more detail, the product delivery device may include a flexible, collapsible bag 55. The pressure boundary for the propellant 40 is formed, in part, by the collapsible bag 55. Or the product delivery device may comprise a dip tube 56. The pressure boundary for the propellant 40 may be formed, in part, by the underside of the dispensing valve when the valve is closed.

The outer container 22, dispensing valve, dip tube 56 and/or collapsible bag 55 may be polymeric. By polymeric it is meant that the component comprises polymers, such as polyolefin, polyester, or nylon. Thus, the entire aerosol dispenser 20 or, specific components thereof, may be free of metal. The valve cup 26 may comprise ductile and formable metal such as low carbon steel or aluminum. The valve cup 26 may be stamped and clinched in known fashion.

The outer container 22, collapsible bag 55, and/or dip tube 56, may be transparent or substantially transparent. If both the outer container 22 and a collapsible bag 55 used as the product delivery device are transparent, this arrangement provides the benefit that the consumer knows when product 42 is nearing depletion and allows improved communication of product 42 attributes, such as color, viscosity, etc. Also, labeling or other decoration 57 of the container 22 may be more apparent if the background to which such decoration is applied is transparent or substantially transparent. Alternatively or additionally, the outer container 22, collapsible bag 55, etc. may be colored with like or different colors.

The outer container 22 may define a longitudinal axis LA of the aerosol dispenser 20. The outer container 22 may be axisymmetric as shown, or, may be eccentric. While a round cross-section is shown, it is to be appreciated that other non-round cross-sections may be used. The cross-section may be square, elliptical, irregular, etc. Furthermore, the cross section may be generally constant as shown, or may be variable. If a variable cross-section is selected, the outer container 22 may be, for example, barrel shaped, hourglass shaped, or monotonically tapered.

The outer container 22 may range from 6 to 40 cm in height, taken in the axial direction and from 4 to 60 cm in diameter if a round footprint is selected. The outer container 22 may have a volume ranging from 50 or 115 cc to 1000 cc exclusive of any components therein, such as a product delivery device. The outer container 22 may be injection stretch blow molded. The injection stretch blow molding process may provide a stretch ratio of greater than 8, 8.5, 9, 9.5, 10, 12, 15 or 20.

The outer container 22 may sit on a base. The base is disposed on the bottom of the outer container 22 and of the aerosol dispenser 20. Suitable bases include petaloid bases, champagne bases, hemispherical or other convex bases used in conjunction with a base cup. Or the outer container 22 may have a flat base with an optional push-up. A push-up is a concavity in the bottom of the container and extending towards the neck 24 of the container. A push-up is distinguishable from a general concavity in the bottom of a container, as a push-up has a smaller diameter than is defined by the footprint of the bottom of the container. The push-up may be axisymmetric about the longitudinal axis LA. The vertex of the push-up may be coincident the longitudinal axis LA. The outer container 22 sidewall also defines a diameter.

The outer container 22 may be pressurized to an internal gage pressure of 100 to 970, 110 to 490 or 270 to 420 kPa. The aerosol dispenser 20, as presented to a user may have an initial pressure. The initial pressure is the highest pressure encountered for a particular filling operation and corresponds to no product 42 yet being dispensed from the product delivery device. As product 42 is depleted, the outer container 22 approaches a final pressure. The final pressure corresponds to depletion of substantially all product 42, except for small residual, from the product delivery device. For example, a particular aerosol dispenser 20 may have an initial propellant 40 pressure of 1100 kPA and a final propellant 40 pressure of 120 kPa, an initial propellant 40 pressure of 900 kPA and a final propellant 40 pressure of 300 kPa, an initial propellant 40 pressure of 500 kPA and a final propellant 40 pressure of 0 kPa, etc. The propellant 40 pressurizes the product 42 to a pressure greater than ambient, to provide for delivery from the aerosol dispenser 20.

The outer container 22, and all other components, except the TPE gasket 24G, and valve cup 26 may comprise, consist essentially of or consist of PET, PEN, Nylon EVOH or blends thereof to meet DOT SP 14223. Such materials may be recyclable or selected so that the finished container may be recycled in a single steam, such as discussed in U.S. patent application Ser. No. 16/120,493.

The neck 24 may be connected to the container sidewall by a shoulder 23. The shoulder 23 may be joined to the sidewall by a radius. The shoulder 23 may have an annular flat. The neck 24 may have a greater thickness at the top of the outer container 22 than at lower portions of the neck 24 to provide a differential thickness. Such differential thickness may be accomplished through having an internally stepped neck 24 thickness.

The propellant 40 may comprise nitrogen, air, and mixtures thereof. Propellant 40 listed in the US Federal Register 49 CFR 1.73.115, Class 2, Division 2.2 are also considered acceptable. The propellant 40 may comprise a hydrofluoroolefin, a Trans-1,3,3,3-tetrafluoroprop-1-ene, and optionally a CAS number 1645-83-6 gas. One such propellant 40 is commercially available from Honeywell International of Morristown, N.J. under the trade name HFO-1234ze or GWP-6. The propellant 40 may comprise another hydrofluoroolefin, a trans-1-chloro-3,3,3-trifluoropropene, and optionally a CAS number 102687-65-0. One such propellant 40 is commercially available from Honeywell International of Morristown, N.J. under the trade name Solstice® Performance Fluid (PF). The propellant 40 may be comprised of a single chemical component or from a blend of one or more components to create the desired physical properties for the aerosol dispenser. An example would be a physical blend of the HFO1234ze with the Solstice PF (HFO ZE/PF) in a 70:30 ratio by weight. The propellant 40 may be condensable. By condensable, it is meant that the propellant 40 transforms from a gaseous state of matter to a liquid state of matter within the outer container 22 and under the pressures encountered in use. Generally, the highest pressure occurs after the aerosol dispenser 20 is charged with product 42 but before that first dispensing of that product 42 by the user. A condensable propellant 40 provides the benefit of a flatter depressurization curve as product 42 is depleted during usage. A condensable propellant 40 provides the benefit that a greater volume of gas may be placed into the container at a given pressure. Upon dispensing of a sufficient volume of product 42 from the space between the outer container 22 and the product delivery device, the condensable propellant 40 may flash back to a gaseous state of matter.

The pressurizeable container 22 may be charged with an amount of product 42 which brings the pressure, as initially presented to the user, sufficient to dispense and substantially deplete the product 42 from the aerosol dispenser 20. The final pressure, after substantially all product 42 is depleted, may be less than the initial pressure.

Product 42 may be charged into the container through the dispensing valve. When product 42 is charged into the container, the product 42 increases the pressure of the propellant 40. The increase in propellant 40 pressure occurs due to the increase in volume of the collapsible bag 55 if such a bag 55 is used as a product delivery device. Likewise, the increase in propellant 40 pressure occurs due to the increase in the number of moles of product 42 in the outer container 22 if a dip tube 56 is selected. An aerosol dispenser 20 may be made as described in US Patent Publication Nos. 2012/0292338A1; 2012/0291911A1; and 2012/0291912A1.

Referring to FIG. 4, the outer container 22 may have a round crimp ring 24CR with an inside diameter oriented towards the longitudinal centerline LA and an outer diameter opposed thereto. The crimp ring 24CR may be thought of as having three conjoined surfaces, an upper surface 24CRU, a lower surface 24CRL opposed thereto, and an outer surface 24CRO joining the upper surface 24CRU and lower surface 24CRL. The three surfaces 24CRU, 24CRL, and 24CRO are shown in parallel and orthogonal relationships, although, it is to be appreciated that any suitable angular relationship may be used.

As previously discussed, dispensers may undergo inadvertent or intentional heating. Having a dispenser that is made from plastic components, such as the crimp ring 24CR, makes the dispenser subject to deformation as the dispenser is exposed to elevated temperatures and excessive temperatures. An elevated temperature refers to a temperature at or slightly below the heat distortion temperature for the given material. The heat distortion temperature (HDT) of a plastic material is the temperature at which the material deforms under a specific load. The HDT can be determined, for example, by ASTM D648 or ISO 75 standards. For polymeric materials such as polyethylene terephthalate (PET), the heat distortion temperature is related to the glass transition temperature of the polymer. The glass transition is a gradual transition of the amorphous region of the structure from a relatively hard and glassy state to a viscous state as the temperature is increased through the glass transition temperature. As will also be appreciated by those skilled in the art, a plastic material may exhibit significant distortion at temperatures slightly below the HDT depending on the applied stress and length of time the material is exposed to said the applied stress at elevated temperatures. The HDT for a given type of material will also vary depending on the plastic morphology, such as crystallinity, and the processing history. Thus, an elevated temperature of a bottle herein will be a temperature slightly below the heat distortion temperature where the plastic material of a bottle subject to an applied load will begin to distort. As temperatures exceed the HDT, the resulting modulus of the material will rapidly decrease. For containers exposed to these excessive temperatures, the resulting distortion of the components under load may create a potentially dangerous situation. The pressure within the dispenser combined with the reduced modulus of the components may reach a point where a component or portion of the dispenser is forcefully separated from the dispenser. The following disclosure addresses this situation and describes a dispenser that may safely depressurize. It is to be appreciated that the dispenser may maintain the seal formed between the crimp ring 24CR and the gasket 24G or the seal formed between the crimp ring 24CR and the valve cup 26 at elevated temperatures, and the dispenser may safely and effectively depressurize at excessive temperatures.

The aerosol dispenser 20 may include one or more features to allow for safe depressurization in the event that one or more components suffer from heat distortion. For example, the crimp ring 24CR may include one or more vents in various configurations to provide for controlled release of pressure should overpressurization occur. More specifically, upon over pressurization, the neck 24 may bulge to a barrel shape, causing the upper surface 24CRU to deform, such as by rotating inwardly toward the longitudinal axis. Propellant 42 and/or product 40 may then leak past the gasket 24G and be exhausted to ambient outwardly through the vents 25.

Figure 5:
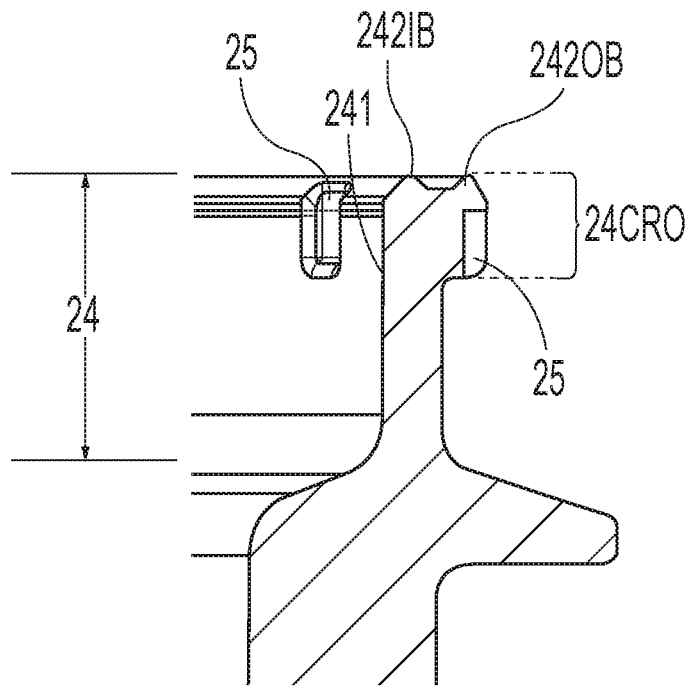
FIG. 5 is a partial detailed view of a crimp ring having two annular beads and vents on an outer surface and an inside diameter surface.
Figure 6:
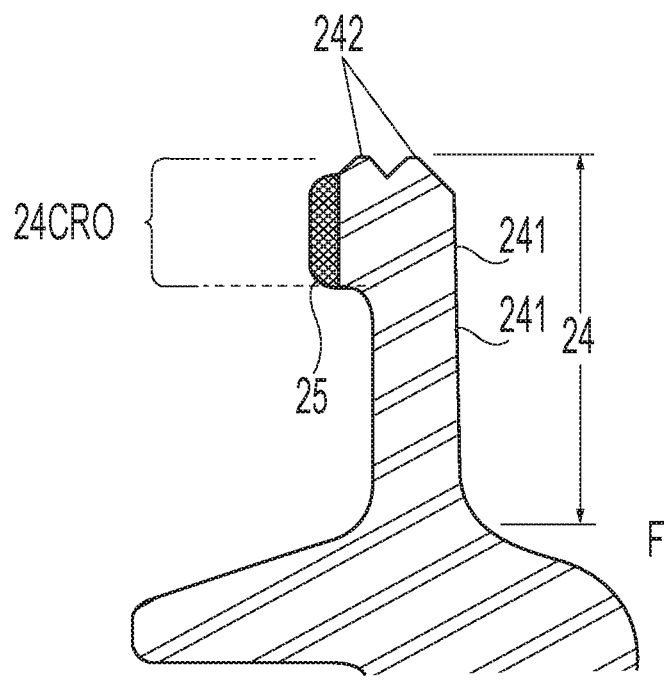
FIG. 6 is a partial detailed view of a crimp ring having two annular beads and a vent on an outer surface.

Referring to FIGS. 4-6, the outer surface 24CRO of the crimp ring 24CR may have at least one vent 25. The vent 25 comprises a channel through the outer surface 24CRO and between the outer surface 24CRO and the valve cup 26. The vent 25 may extend throughout the entire length of the outer surface 24CRO, or the vent 25 may extend through only a portion of the outer surface 24CRO.

Figure 7:
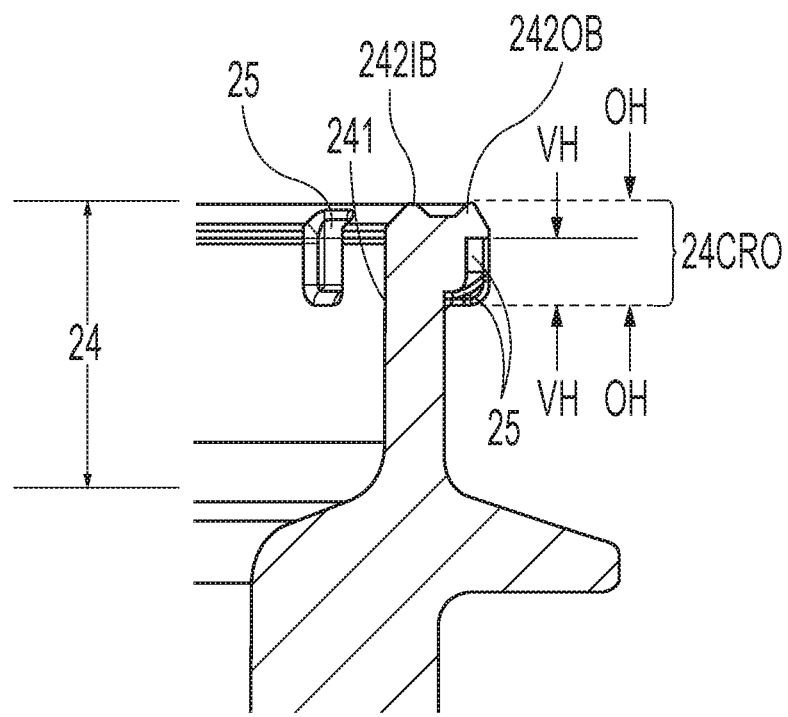
FIG. 7 is a partial detailed view of a crimp ring having two annular beads and vents on an outer surface, lower surface, and an inside diameter surface.

With reference to FIG. 7, vents 25 may also be disposed on the lower surface 24CRL of the crimp ring 24CR. These vents 25 may be aligned with the vents 25 on the outer surface 24CRO of the crimp ring 24CR. The vents 25 may extend through the entire length of the lower surface 24CRL to provide for adequate venting. These additional and optional vents 25 provide for venting between the lower surface 24CRL and the valve cup 26.

Figure 8:
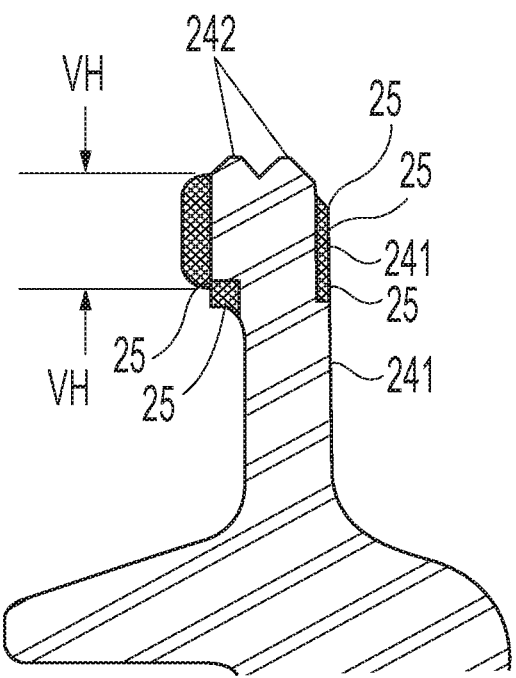
FIG. 8 is a partial detailed view of a crimp ring having two annular beads and vents on an outer surface, lower surface, and an inside diameter surface.

Referring to FIGS. 5, 7, and 8, for illustrative purposes only, vents 25 may also be placed on the inside diameter surface 241 of the neck 24 or crimp ring 24CR. Such vents 25 may extend in the longitudinal direction to at least the bottom of the valve cup 26 which may be positioned adjacent the inside diameter surface 241 of the neck 24. These vents 25 may not extend to the shoulder 23 or the bottom of the neck 24 for strength. The vents 25 on the inside diameter surface provide for venting between the inside of the neck 24 and the valve cup 26.

With reference to FIGS. 4-7, it is to be appreciated that the one or more vents 25 may be disposed on any one of the outer surface 24CRO, inside diameter surface 241, and lower surface 24CRL. Further, the one or more vents 25 may be disposed on any combination of the outer surface 24CRO, inside diameter surface 241 and/or lower surface 24CRL without limitation and in any combination thereof. Further still, the one or more vents 25 may be disposed on all three of the outer surface 24CRO, inside diameter surface 241, and lower surface 24CRL. The vents located on any one surface may be circumferentially spaced. The vents 25 may be equally spaced or spaced at different intervals, depending upon the particular design. Circumferential spacing of the vents 25 allows for exhaust in the event deformation of the neck 24 is eccentric or occurs unevenly. Providing a path for propellant and/or product to be released allows for the dispenser to safely depressurize.

For any of the aforementioned surfaces, i.e. the inside diameter of the neck 24, the upper surface 24CRU of the crimp ring 24CR, and lower surface 24CRL of the crimp ring 24CR, one, two, or at least three spaced vents 25 may be used. There may be from four vents 25 to twelve vents 25. The vents 25 may be of constant cross section or variable cross section. The vents 25 may be of equal or unequal size, geometry, and flow area. The vents 25 may be equally or unequally circumferentially spaced. The vents 25 may have any suitable cross section and hydraulic radius that allows for a path for propellant and/or product to exit when the dispenser becomes overpressurized. For example, for a crimp ring 24CR having an outer radius of 32 mm, and an aerosol dispenser 20 having typical internal pressures, eight equally spaced vents 25, each having a radial depth of 0.8 millimeters may be used. The vents 25 disposed on the outer surface 24CRO may be radially offset from the vents 25 disposed on the inside diameter surface 241. The offset design allows for a greater surface area between the vents disposed on the outer surface 24CRO and the vents disposed on the inside diameter surface 241. The increase in surface area between vents may provide for a relatively more robust seal.

Referring particularly to FIG. 8, optionally a circumferential vent 25 may connect the axial vents 25 on the outer surface 24CRU, the axial vents 25 on the inside diameter surface 241 of the crimp ring 24CRU, or the radial vents on the lower surface 24CRU. Such a circumferential vent prophetically allows cross communication between the aforementioned axial and radial vents.

Referring generally to FIGS. 5-8, the vents 25 on the inside diameter of the neck 24 and outer surface 24CRO may be longitudinally parallel or skewed relative to the longitudinal axis LA. The vents 25 on the lower surface 25CRL may be radially oriented, or radially skewed, such as spirally oriented.

Figure 9:
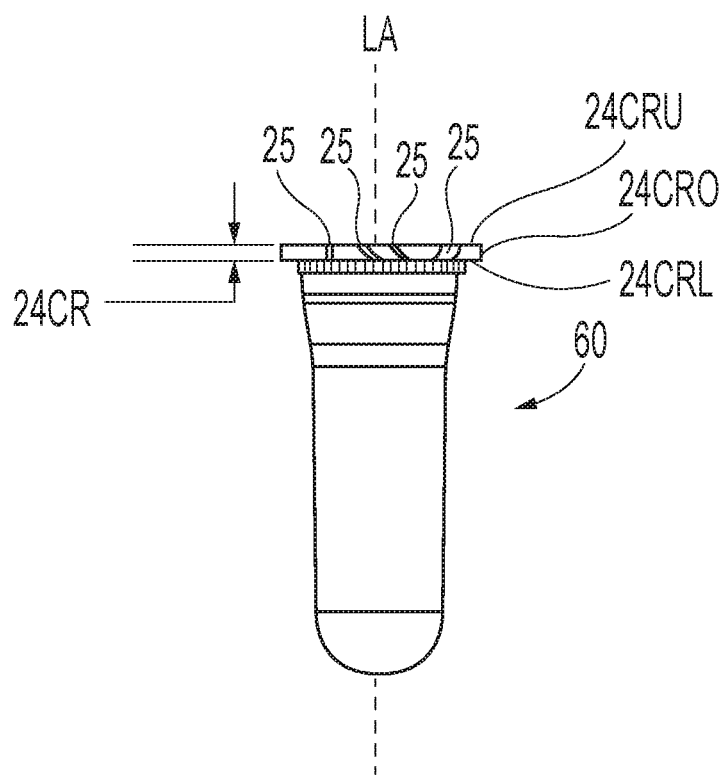
FIG. 9 is a side view of a preform for the outer container having irregularly shaped and irregularly spaced vents.
Figure 10:
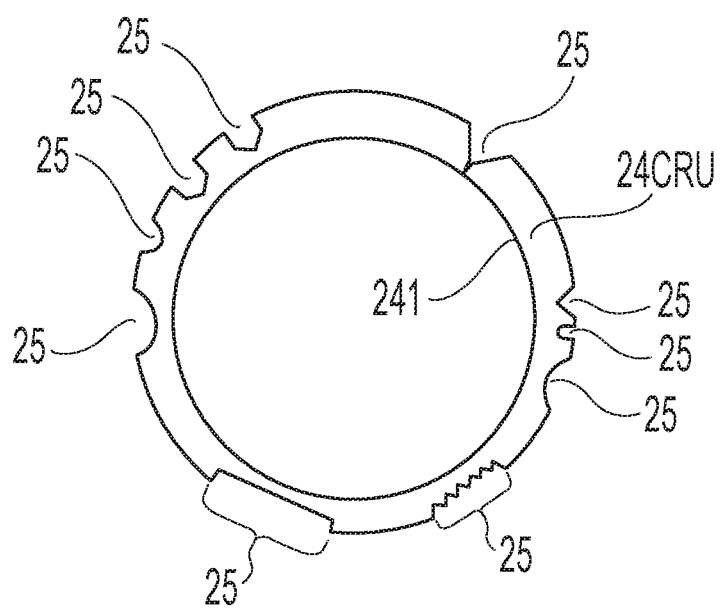
FIG. 10 is a top plan view of a preform for the outer container having irregularly shaped and irregularly spaced vents.

Referring to FIGS. 9 and 10, any of the aforementioned vents 25 may be incorporated into the preform 60. The preform 60 having the vents 25 is blown into an outer container 22, such as by using known ISBM techniques. This arrangement provides the benefit that the vents 25 are present without additional steps or complexity being required during manufacture. The vents 25 may be machined into the crimp ring 24CR using known techniques. For example, the vents 25 may be injection molded into the crimp ring 24C, or the vents 25 may be molded into the preform 22P, which is later molded into the outer container 22, using known ISBM techniques.

Referring back to FIG. 7, vents 25 on the outer surface may extend to the upper surface 24CRU or may only extend through a portion of the outer surface 24CRO. Vents 25 that do not extend through to the upper surface 24CRU may help provide a more robust seal between the crimp ring 24CR, the gasket 24G, and the valve cup 26, preventing pre-mature venting before depressurization is desired or needed. Stated another way, a vent 25 that extends through the upper surface 24CRO may result in contact area between the gasket 24G and the upper surface 24CRU of the crimp ring 24CR. This relatively smaller amount of surface area between the upper surface 24CRU and the gasket 24G may lead to more rapid separation of the gasket 24G and the crimp ring 24CR when the dispenser is exposed to elevated temperatures and failure to continue to maintain contact between the upper surface 24CRU and the gasket 24G as the crimp ring 24CR deforms. This may be undesirable because it may lead to the premature leakage of propellant and/or product or it may result in more product and/or propellant being released than is necessary to maintain a dispenser that is safe for consumers.

To better seal the gasket 24G to the crimp ring 24CR and to better control the release of propellant and/or product from the dispenser, the vent 25 on the outer surface 24CRO may not extend through the upper surface 24CRU. Stated another way, the vent 25 may extend through only a portion of the outer surface 24CRO such as illustrated in FIG. 7. The vent height VH may be less than the crimp ring 24CR outer surface height OH. The vent height VH and the outer surface height OH may be measured parallel to the longitudinal axis. By having the vent 25 terminate before reaching the upper surface 24CRU, the gasket 24G has a greater surface area over which to form a seal to the upper surface 24CRO of the crimp ring 24CR. It is to be appreciated that due to the greater surface area over which the upper surface 24CRO and the gasket 24G operatively engage to form a seal, the dispenser may maintain the seal at elevated temperatures for a relatively longer period of time and/or at a relatively higher pressures. Stated another way, the seal formed between the crimp ring 24CR and the gasket 24G minimizes or eliminates leakage of propellant and/or product at elevated temperatures.

Despite having a relatively, more robust seal, this design still allows the dispenser to be safely used by a consumer. Further, as illustrated in FIG. 7, the vent 25 disposed in the outer surface 24CRO of the crimp ring 24CR may be used in combination with other vents 25, as previously discussed, which may include a vent 25 extending through the lower surface 24CRL and/or a vent 25 on the inside diameter surface 241.

Further still, a crimp ring 24CR including a vent 25 disposed on the outer surface 24CRO that extends through a portion of the outer surface 24CRO also aids in allowing the crimp ring 24CR to reseal against, for example, the valve cup 26 once the dispenser has released enough propellant and/or product to safely operate. The upper surface 24CRU of the crimp ring 24 has a greater surface area when the vent 25 does not extend therethrough. By increasing the upper surface area 24CRU, it is believed that a portion of the crimp ring 24 may more readily reseal to the valve cup 26 and/or the gasket 24G. By having the crimp ring 24CR reseal to the valve cup 26 and/or gasket 24G once enough propellant and/or product has been released may allow the consumer to continue using the dispenser.

Figure 11:
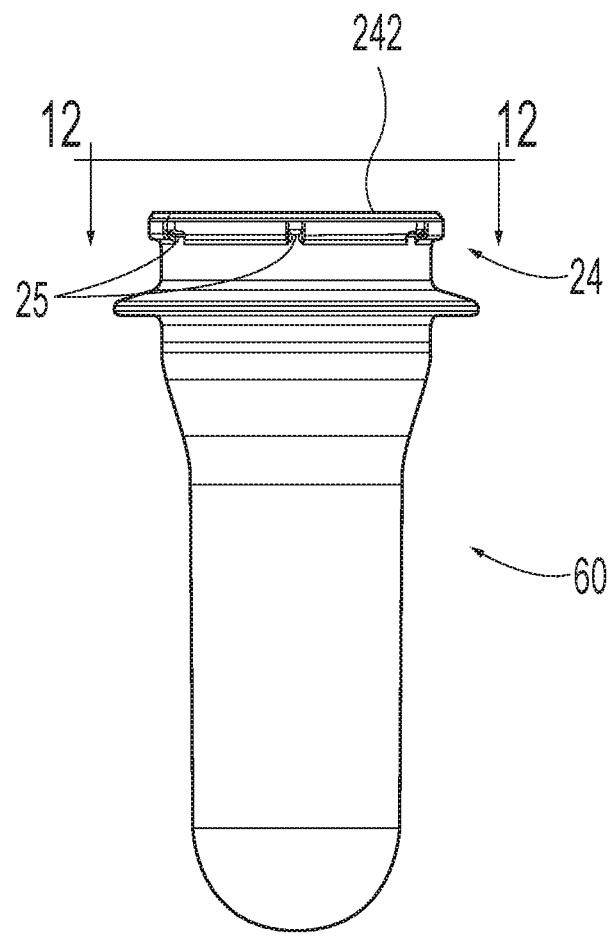
FIG. 11 is a side elevation view of a preform having annular beads and vents on an outer surface of a crimp ring.
Figure 12:
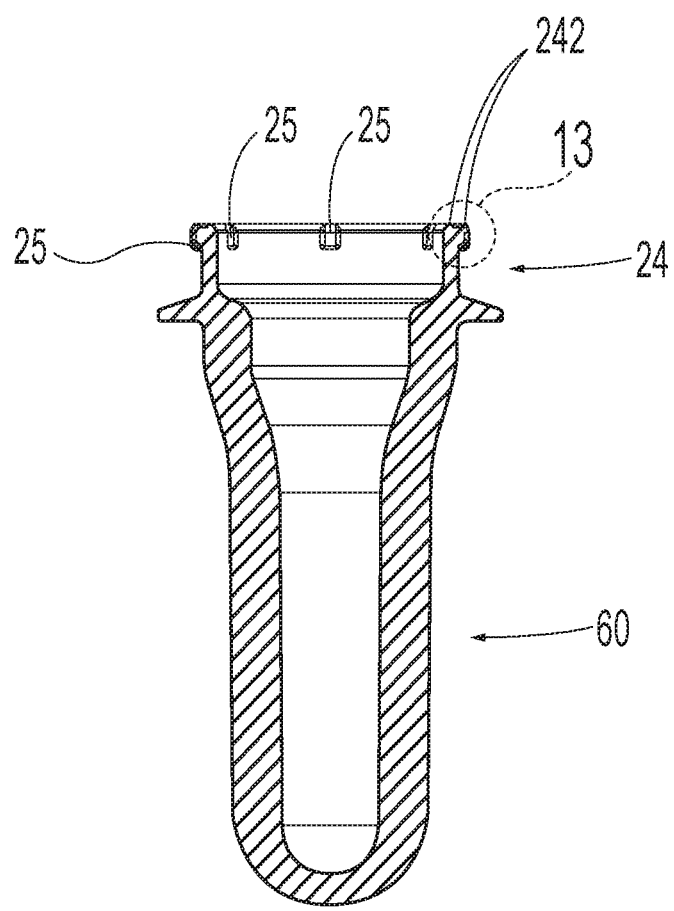
FIG. 12 is a sectional view of FIG. 11 taken along lines 12-12.
Figure 13:
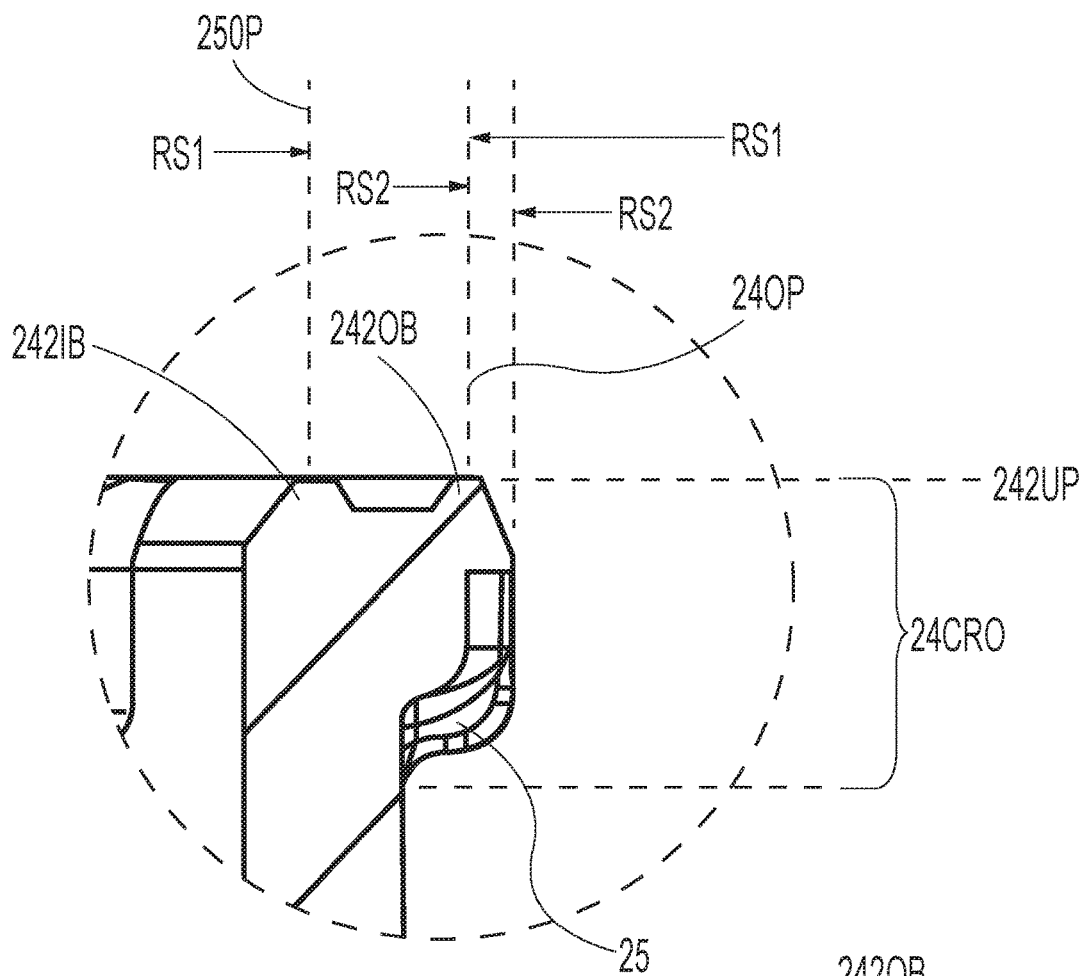
FIG. 13 is an exploded view of a portion of the preform of FIG. 12.

In addition to, or in alternative of the vents, the upper surface 24CRU of the crimp ring 24CR includes one or more annular beads 242, such as inner and outer annular beads 2421B and 2420B shown in FIGS. 11-13 for illustrative purposes only. It is believed that the annular beads 242 aid in maintaining a seal between the gasket 24G and the crimp ring 24CR.

Exemplary annular beads 242 are illustrated in FIGS. 5, 7, and 11-16. It has been found that the spacing of the annular beads relative to each other and/or the positioning of the annual beads relative to the outer surface 24CRO and/or vents of the crimp ring 24CR may affect the seal formed between the crimp ring 24CR and the gasket 24G or the seal formed between the crimp ring 24CR and the valve cup 26 at elevated temperatures, and the depressurization at excessive temperatures.

Figure 14:
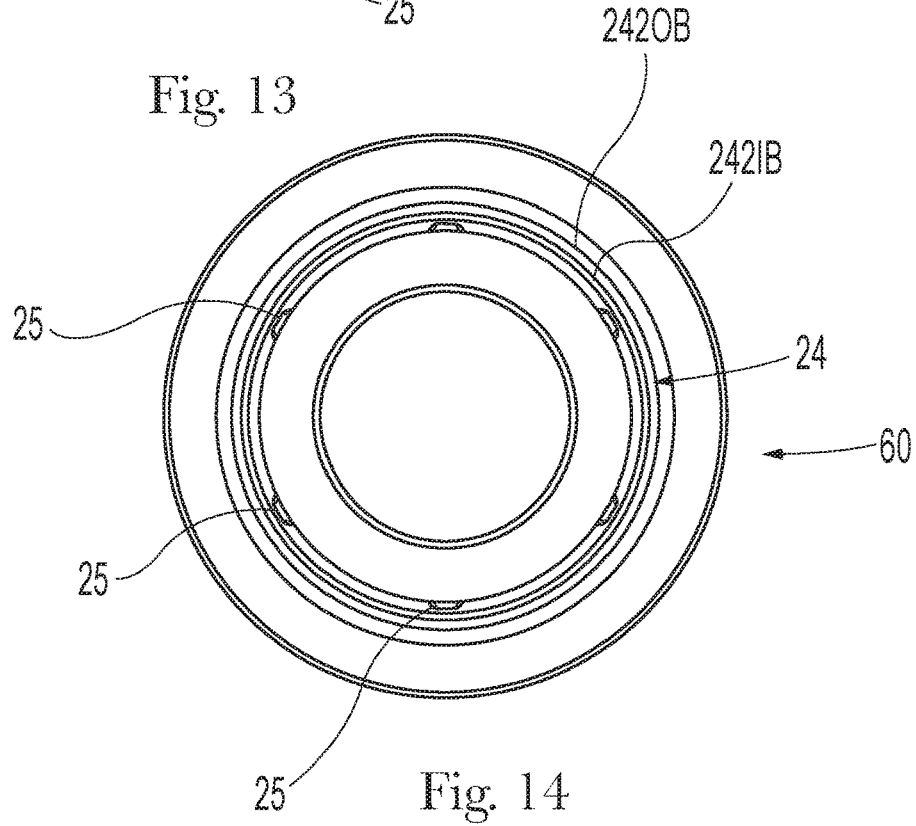
FIG. 14 is top, plan view of the preform of FIG. 11.
Figure 15:
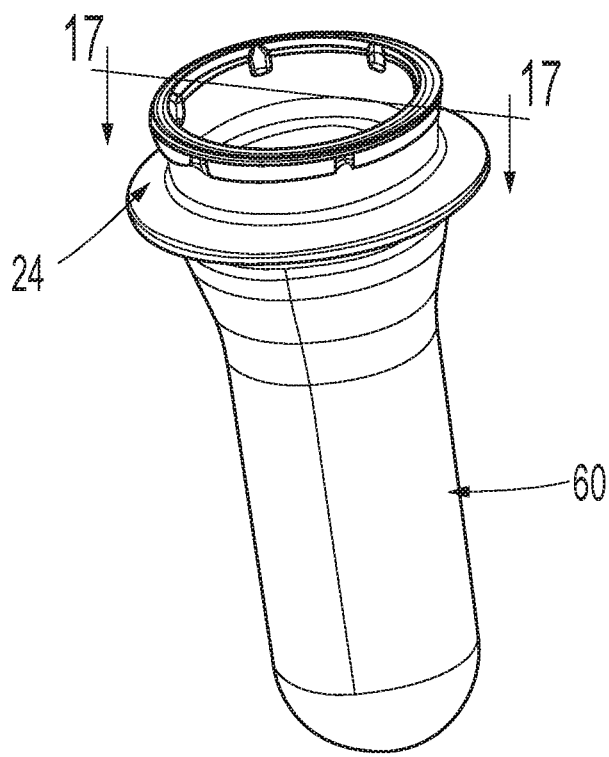
FIG. 15 is a side, perspective view of a preform having circumferentially aligned vents on an outer surface and an inside diameter surface of a crimp ring.
Figure 16:
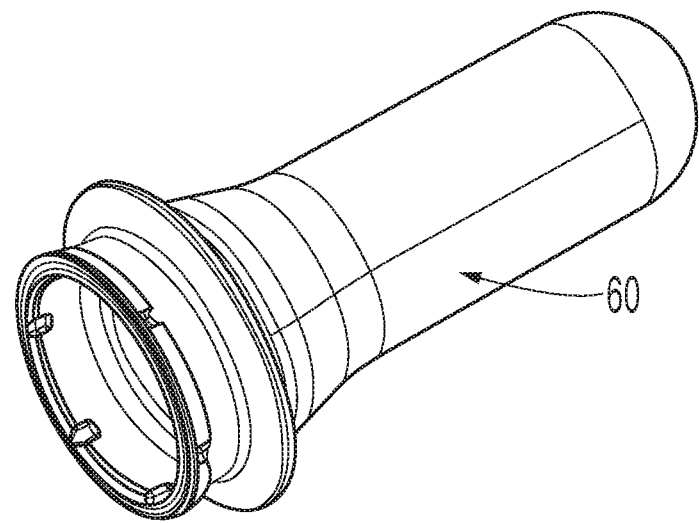
FIG. 16 is a perspective view of the perform of FIG. 15.

With reference to FIGS. 13 and 14, the annular beads 242 may be defined by a longitudinally uppermost point 242UP in the longitudinal direction. The outer surface 24CRO of the crimp ring 24CR may be defined by an radially outermost point 240P. The spacing and positioning of the inner and outer annual beads 2421B and 2420B may be described by the positioning of the longitudinally uppermost points 242UP of the annual beads. A first radial distance RS1 between the longitudinally uppermost point 242UP of the outer annual bead 2420B and the longitudinally uppermost point 242UP of the inner annual bead 2421B may be greater than a second radial distance RS2 between the longitudinally uppermost point 242UP of the outer annual bead 2420B and the radially outermost point 240P of the outer surface 24CRO.

Figure 19:
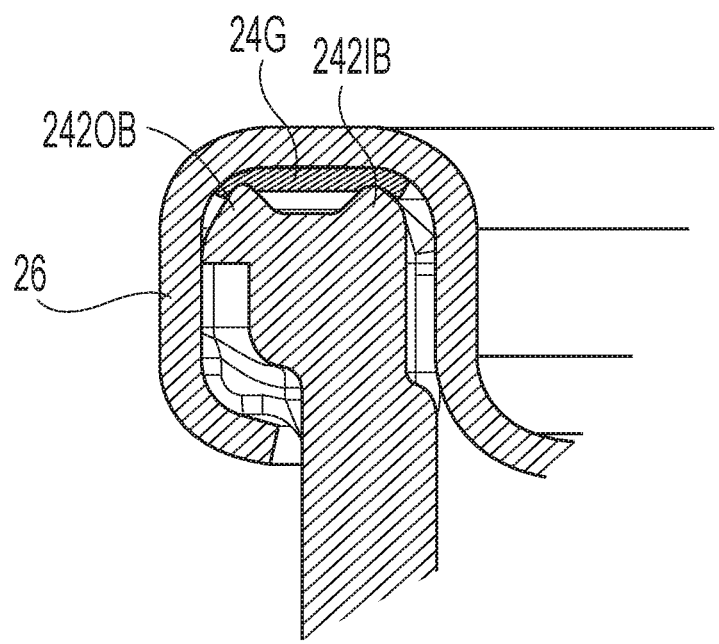
FIG. 19 is a partial sectional view of an outer container for the aerosol dispenser joined with a valve cup and sealed with a gasket.
Figure 20:
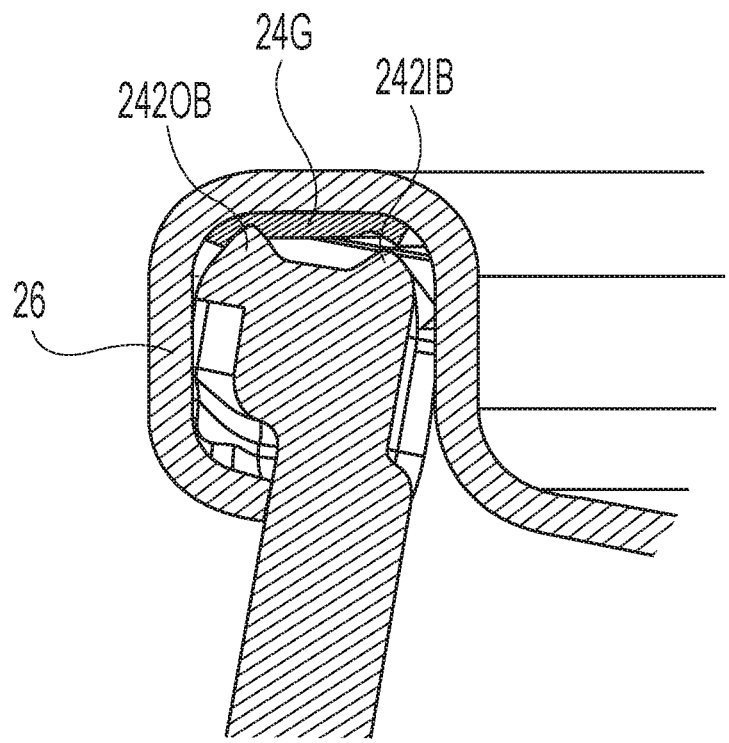
FIG. 20 is an alternative view of FIG. 19, illustrating movement and deformation of the outer container relative to the gasket and valve cup due to elevated temperature.

The first radial distance RS1 between the longitudinally uppermost point 242UP of the outer annual bead 2420B and the longitudinally uppermost point 242UP of the inner annual bead 2421B may be at least 50%, or at least 75%, or at least 100%, or at least 125%, or at least 150%, or at least 175%, or at least 200% greater than the second radial distance RS2 between the longitudinally uppermost point 242UP of the outer annual bead 2420B and the radially outermost point 240P of the outer surface 24CRO. It has been found that increasing the first radial distance RS1 between the inner annular bead 2421B and the outer annular bead 2420B provides a more robust seal between the gasket 24G to the crimp ring 24CR and better control for the release of propellant and/or product from the dispenser than annular beads that are positioned relatively closer to each other. Overpressurization and deformation at elevated temperatures may lead to distortion of the crimp ring 24CR causing an inward rotation toward the longitudinal axis within the clinched valve cup 26, such as illustrated in FIGS. 19 and 20. With continuing reference to FIGS. 19 and 20, this rotation results in a declination of the upper surface 24CRU with respect to the valve cup 26. As the angle of the declination increases, sealing contact of the inner annular bead 2421B to the gasket 24G will be lost. The outer annular bead 2420B being at a larger radial distance from the inner annual bead 2421B will remain in contact with the gasket 24G at larger degrees of rotation and angular declination of the upper surface 24CRU.

In a crimp ring 24CR design having a vent that extends from the lower surface 24CRL through a portion of the outer surface 24CRO, the positioning of the annular bead 242 relative to the vent 25 may also impact the seal between the crimp ring 24CR and the gasket 24G or the valve cup 26. It has been found that positioning the annular bead 242, specifically an outer annular bead 2420B if two or more annular beads are present, such that the longitudinally uppermost point 242UP of the annular bead 242 is radially further from the longitudinal axis than a radially outermost point 250P of the vent on the outer surface 24CRO, may provide a most robust seal.

With reference to FIGS. 12 and 13, the vents 25 on the outer surface 24CRO and the inside diameter surface 241 may be circumferentially offset while at the same time having the first radial distance RS1 between the inner annular bead 2421B and the outer annular bead 2420B greater than a second radial distance RS2 between the outer annual bead 2420 and the radially outermost point 240P of the outer surface 24CRO.

Figure 17:
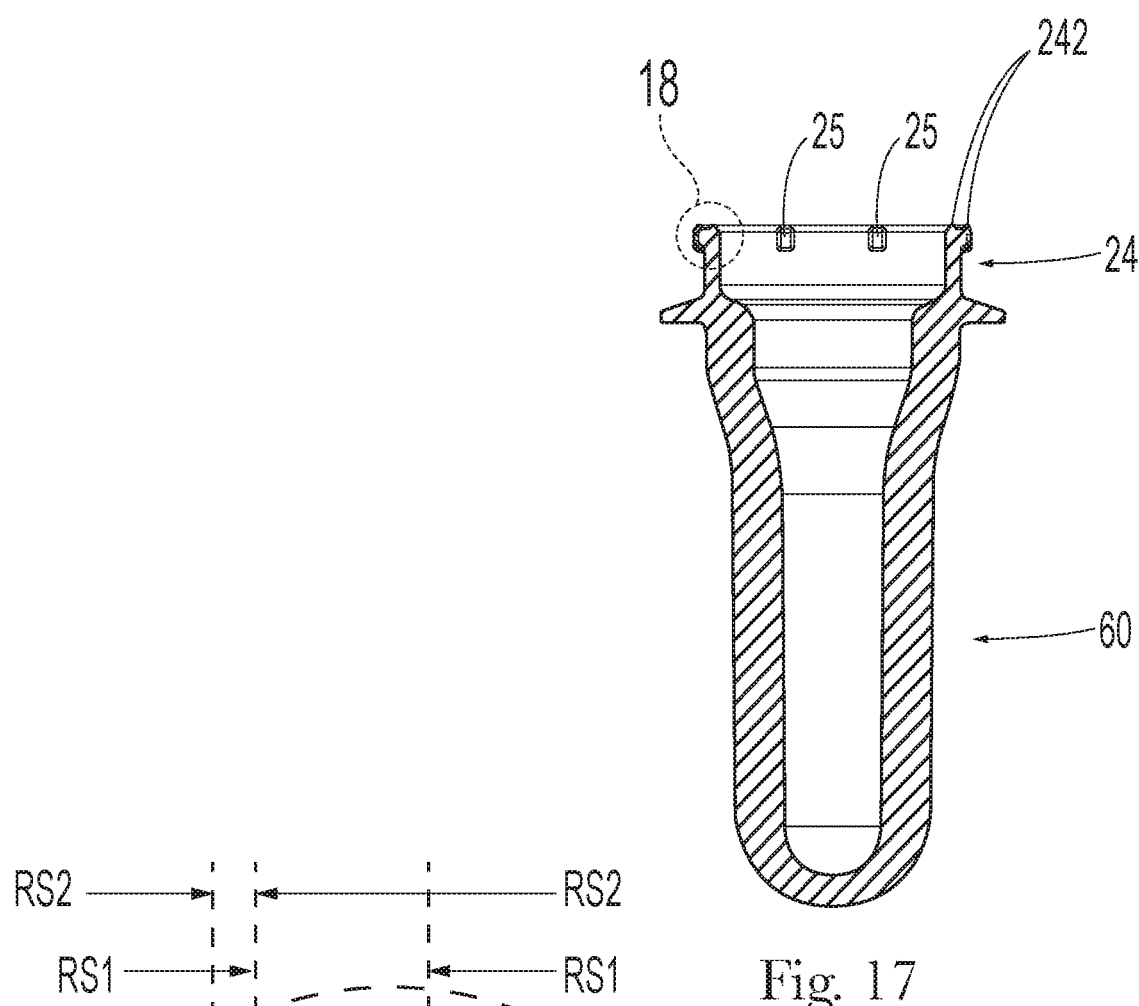
FIG. 17 is a sectional view of FIG. 15 taken along lines 17-17.
Figure 18:
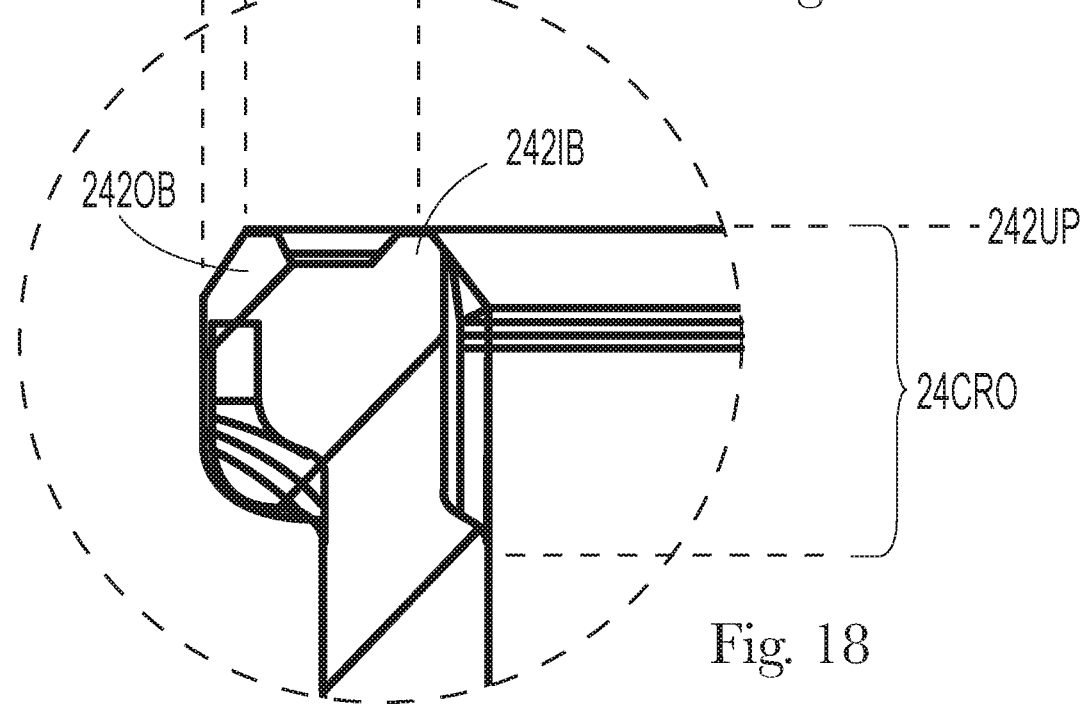
FIG. 18 is an exploded view of a portion of the preform of FIG. 17.

With reference to FIGS. 17 and 18, the vents 25 on the outer surface 24CRO and the inside diameter surface 241 may be circumferentially aligned while at the same time having the first radial distance RS1 between the inner annular bead 2421B and the outer annular bead 2420B greater than a second radial distance RS2 between the outer annual bead 2420 and the radially outermost point 240P of the outer surface 24CRO.

It is to be appreciated that although throughout the disclosure the dispenser is referred to as containing propellant and/or product any fluid and/or gas may be contained in the dispenser. One of ordinary skill in the art would recognize that there are various fluids and gasses which may behave similar to the propellant and product and readily adapt the teachings within this disclosure to such.

It is also to be appreciated that a dispenser may not include a gasket 24G. The upper surface 24CRU may operatively engage the valve cup 26 to form a seal.

It is to be appreciated that the neck or a portion thereof may be subject to a thermal crystallization process to stabilize the material from deformation and to control movement of the plastic at elevated temperatures. Crystallization may be performed as described in U.S. Pat. No. 9,758,294. The area of neck adjacent to the crimp ring 24CR may be crystallized. This will allow for movement of the crimp ring 24CR while the area adjacent the crimp ring remains substantially stable.

A dispenser including the characteristics as previously described may maintain a seal such that no propellant and/or product is released at or below about 65° C. At temperatures above about 65° C., the plastic crimp ring 24CR may undergo deformation and overpressurization of the dispenser may result. However, the dispenser as described may allow for releasing a sufficient amount of propellant and/or product to alleviate the overpressurization and may allow for resealing and continued use of the dispenser. It is also to be appreciated that some excessive temperatures may result in the dispenser safely venting the excessive pressure and no longer containing enough propellant and/or product to continue use by a consumer.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A container for use in an aerosol dispenser, the container comprising:
   a crimp ring defining an open top and extending about a longitudinal axis; a closed end bottom opposite the open top;
   a sidewall extending between the crimp ring and the closed end bottom; wherein the crimp ring comprises:
      an upper surface and a lower surface opposite the upper surface, wherein the upper surface and the lower surface are joined by an outer surface, and an inside diameter surface opposite the outer surface, wherein the outer surface comprises a radially outermost point,
      wherein the upper surface comprises an outer annular bead proximal to the outer surface and an inner annular sealing bead proximal to the inner surface; and
      wherein the outer annual bead and the inner annual bead each comprise a longitudinally uppermost point, wherein the radial distance between the longitudinally uppermost point of the inner annular bead and the longitudinally uppermost point of the outer annular bead is greater than the radial distance between the longitudinally uppermost point of the outer annular head and the radially outermost point of the outer surface,
   wherein a vent is disposed on the outer surface of the crimp ring, wherein the vent extends from the lower surface through only a portion of the outer surface and the vent does not extend through the upper surface.

2. The container of claim 1, wherein the radial distance between the longitudinally uppermost point of the inner annular bead and the longitudinally uppermost point of the outer annular bead is at least 100% longer than the radial distance between the longitudinally uppermost point of the outer annular bead and the radially outermost point of the outer surface.

3. The container of claim 1 further comprising a plurality of circumferentially spaced vents disposed on the outer surface of the crimp ring.

4. The container of claim 1 further comprising a plurality of integrally injection molded circumferentially spaced vents disposed on the outer surface of the crimp ring.

5. The container of claim 1 further comprising a first plurality of integrally injection molded circumferentially spaced vents disposed on the outer surface of the crimp ring and a second plurality of circumferentially spaced vents disposed on the lower surface of the crimp ring and circumferentially aligned with the first plurality of vents.

6. The container of claim 1 further comprising a first plurality of integrally injection molded circumferentially spaced vents disposed on the outer surface of the crimp ring and a second plurality of circumferentially spaced vents disposed on the inside diameter surface of the crimp ring.

* * * * *